United States Patent
Kodama et al.

(10) Patent No.: US 10,269,491 B2
(45) Date of Patent: Apr. 23, 2019

(54) CERAMIC ELECTRONIC COMPONENT

(71) Applicant: Murata Manufacturing Co., Ltd., Nagaokakyo-shi, Kyoto-fu (JP)

(72) Inventors: Satoshi Kodama, Nagaokakyo (JP); Seiji Katsuta, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 254 days.

(21) Appl. No.: 14/744,337

(22) Filed: Jun. 19, 2015

(65) Prior Publication Data

US 2015/0380164 A1 Dec. 31, 2015

(30) Foreign Application Priority Data

Jun. 30, 2014 (JP) .................. 2014-134399

(51) Int. Cl.
*H01G 4/248* (2006.01)
*H01G 4/30* (2006.01)
*H01G 4/008* (2006.01)
*H01G 4/232* (2006.01)
(Continued)

(52) U.S. Cl.
CPC ............. *H01G 4/30* (2013.01); *H01G 4/0085* (2013.01); *H01G 4/2325* (2013.01); *H01G 4/248* (2013.01); *H01G 2/06* (2013.01); *H01G 4/1227* (2013.01)

(58) Field of Classification Search
CPC ............ H01G 4/30; H01G 4/005; H01G 4/12; H01G 4/00; H01G 4/012; H01G 4/228; H01G 4/248; H01G 4/1227
See application file for complete search history.

(56) References Cited

U.S. PATENT DOCUMENTS 4,458,294 A * 7/1984 Womack ............. H01G 4/2325 338/309
4,615,908 A * 10/1986 Behn ................... H01G 4/2325 361/305

(Continued)

FOREIGN PATENT DOCUMENTS

JP 01-289231 A 11/1989
JP 2000-299243 A 10/2000
(Continued)

OTHER PUBLICATIONS

Official Communication issued in corresponding Japanese Patent Application No. 2014-134399, dated Oct. 11, 2016.
(Continued)

*Primary Examiner* — Nguyen T Ha
(74) *Attorney, Agent, or Firm* — Keating & Bennett, LLP

(57) ABSTRACT

A ceramic electronic component includes an electronic component body, an inner electrode, and an outer electrode. The outer electrode includes a fired electrode layer and first and second plated layers. The fired electrode layer is disposed on the electronic component body. The first plated layer is disposed on the fired electrode layer. The thickness of the first plated layer is about 3 μm to about 8 μm, for example. The first plated layer contains nickel. The second plated layer is disposed on the first plated layer. The thickness of the second plated layer is about 0.025 μm to about 1 μm, for example. The second plated layer contains lead.

10 Claims, 1 Drawing Sheet

(51) Int. Cl.
*H01G 2/06* (2006.01)
*H01G 4/12* (2006.01)

(56) References Cited

U.S. PATENT DOCUMENTS

| | | | |
|---|---|---|---|
| 2002/0046861 A1* | 4/2002 | Yokoyama | H01C 1/148 174/565 |
| 2010/0091426 A1* | 4/2010 | Motoki | H01C 1/148 361/301.4 |
| 2010/0202098 A1* | 8/2010 | Yanagida | H01G 4/232 361/305 |
| 2011/0001399 A1* | 1/2011 | Oguni | H01C 1/14 310/366 |
| 2013/0033154 A1* | 2/2013 | Sakuratani | H01G 4/30 310/366 |
| 2013/0107420 A1* | 5/2013 | Sakurada | H01G 4/2325 361/321.1 |
| 2013/0242462 A1* | 9/2013 | Kawano | H01G 4/005 361/321.1 |
| 2014/0111300 A1* | 4/2014 | Park | H01G 4/30 338/22 R |
| 2014/0198427 A1* | 7/2014 | Kamobe | H01G 4/30 361/301.4 |
| 2015/0001998 A1* | 1/2015 | Katsuta | H01C 7/008 310/366 |
| 2015/0115776 A1* | 4/2015 | Terashita | H01C 7/008 310/365 |

FOREIGN PATENT DOCUMENTS

| | | |
|---|---|---|
| JP | 2003-109838 A | 4/2003 |
| JP | 2011-014698 A | 1/2011 |
| JP | 2013-197186 A | 9/2013 |

OTHER PUBLICATIONS

Official Communication issued in corresponding Japanese Patent Application No. 2014-134399, dated Feb. 28, 2017.

* cited by examiner

CERAMIC ELECTRONIC COMPONENT

BACKGROUND OF THE INVENTION

1. Field of the Invention

The present invention relates to a ceramic electronic component.

2. Description of the Related Art

These days, mounting of many electronic components, such as ceramic electronic components, on a wiring board integrated within an electronic device is widely performed. Hitherto, lead (Pb) solder has been generally used for mounting electronic components on a wiring board. Lately, however, because of the effect lead has on the environment, mounting of electronic components by using Pb-free solder has been actively attempted. However, since Pb-free solder has a relatively high melting point, high-temperature treatment is necessary for soldering using Pb-free solder. As a result, cracks are likely to occur in a ceramic base of a ceramic electronic component due to the difference in the thermal expansion coefficient between the ceramic base and an outer terminal electrode of the ceramic electronic component. Due to the recent increasing electronification of vehicles and also due to an increase in the in-vehicle living space, the size of the engine compartment in a vehicle is decreasing, and at the same time, an electronic control unit (ECU) is installed closer to the engine or the transmission of a vehicle. Accordingly, electronic components are being used in higher temperature environments. In higher temperature environments, a temperature change varies the amounts of expansion and contraction of terminal electrodes or solder. This may generate a mechanical stress, and thus, cracks may occur in solder itself.

In view of this background, the replacement of solder by conductive adhesive is now being considered. In the conductive adhesive used for this type of purpose, a filler metal made of, for example, Ag, is added to a thermosetting resin, such as an epoxy resin. The thermosetting temperature of the conductive adhesive is lower than the melting point of Pb-free solder. Thus, if a conductive adhesive is used for mounting a ceramic electronic component, it is possible to reduce the thermal stress applied to the ceramic base of the ceramic electronic component. Since the conductive adhesive contains resin having high elasticity, cracks do not occur in the bonding medium itself. An example of a ceramic electronic component that can be mounted by using such a conductive adhesive is disclosed in Japanese Unexamined Patent Application Publication No. 2013-197186.

This publication discloses the following ceramic capacitor as a ceramic electronic component that can be mounted by using a conductive adhesive. An outer electrode of the ceramic capacitor includes a first metal layer and a second metal layer. The first metal layer is formed as a first layer of the outer electrode by applying a Cu-containing conductive paste to a ceramic base of the ceramic capacitor and baking it. The second metal layer is formed as a second layer (outermost layer) of the outer electrode by applying an Ag—Pd-containing conductive paste to the first metal layer and baking it. Through this electrode structure, the mounting of the ceramic capacitor using a conductive adhesive is implemented.

As in the electrode structure disclosed in this publication, in a ceramic electronic component including first and second metal layers formed in a manner described above, when forming the second metal layer, thermal diffusion may develop between the second metal layer and the first metal layer, which may cause the formation of porosities in the second metal layer due to the Kirkendall effect. Due to these porosities, the sealing characteristics of the second metal layer for sealing the first metal layer may be impaired, which may decrease the moisture-resistance reliability. Accordingly, because of this need to suppress such thermal diffusion, in the electrode structure disclosed in the above-described publication, it is not possible to sufficiently raise the baking temperature for forming the first and second metal layers. Thus, the second metal layer (outermost layer) is not sufficiently sintered, thereby decreasing the density of the electrode. In the second metal layer having a low density, very small holes may be formed, and these small holes may reach the first metal layer, depending on the location.

If the above-described type of electronic component is mounted on, for example, the ECU in a vehicle, by using conductive adhesive, exhaust gas from the vehicle or gas generated from a lubricant in the engine or the transmission may enter and be sucked into the small holes formed in the second metal layer (outermost layer) and the first metal layer (underlying layer). The gas sucked in this manner contains oil components, and sulfur compounds contained in the oil components may sulfurize the second metal layer and corrode it. During the corrosion, the metal in the second metal layer may melt into the oil components and diffuse in them, and may precipitate and reach the surface of the second metal layer. If this phenomenon continues for a long time, the entire metal in the first metal layer may precipitate and reach the surface of the second metal layer (outermost layer), which may result in a situation where there is no metal left in the first metal layer.

SUMMARY OF THE INVENTION

Accordingly, preferred embodiments of the present invention provide a highly reliable ceramic electronic component that is able to be suitably mounted on, for example, an ECU in a vehicle, by using a conductive adhesive, while preventing the corrosion and precipitation of an outer electrode.

According to a preferred embodiment of the present invention, there is provided a ceramic electronic component including an electronic component body, an inner electrode, and an outer electrode. The electronic component body including first and second principal surfaces extending along a longitudinal direction and a widthwise direction, first and second side surfaces extending along the longitudinal direction and a thickness direction, and first and second end surfaces extending along the widthwise direction and the thickness direction. The inner electrode is disposed within the electronic component body. The outer electrode is disposed on the electronic component body and is electrically connected to the inner electrode. The outer electrode includes a fired electrode layer and first and second plated layers. The fired electrode layer is disposed on the electronic component body. The first plated layer is disposed on the fired electrode layer and is a Ni-plated layer having a thickness of about 3 μm to about 8 μm, for example. The second plated layer is disposed on the first plated layer and is a Pd-plated layer having a thickness of about 0.025 μm to about 1 μm, for example.

The fired electrode layer may preferably contain glass.

The fired electrode layer may preferably contain Cu.

According to preferred embodiments of the present invention, it is possible to provide a highly reliable ceramic electronic component that is able to be suitably mounted on, for example, an ECU in a vehicle, by using a conductive adhesive, while preventing the corrosion and precipitation of an outer electrode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
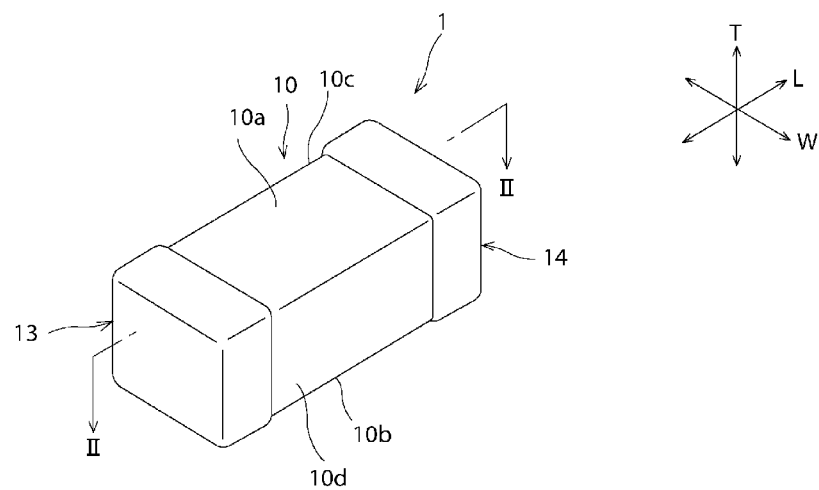
FIG. 1 is a schematic perspective view of a ceramic electronic component according to a preferred embodiment of the present invention.

Preferred embodiments of the present invention will be described below with reference to the accompanying drawings. The following preferred embodiments are only examples, and the present invention is not whatsoever restricted to the following preferred embodiments.

In the accompanying drawings, elements having the same or substantially the same function are designated by like reference numerals. The drawings are only schematically shown, and the proportion of the dimensions of the elements shown in the drawings may be different from that of the actual elements. The proportion of the dimensions of the elements shown in one drawing may be different from that in another drawing. It is understood that the specific proportion of the dimensions of the actual elements be determined from the following description.

An example of the configuration of a ceramic electronic component 1 will be described below.

Figure 2:
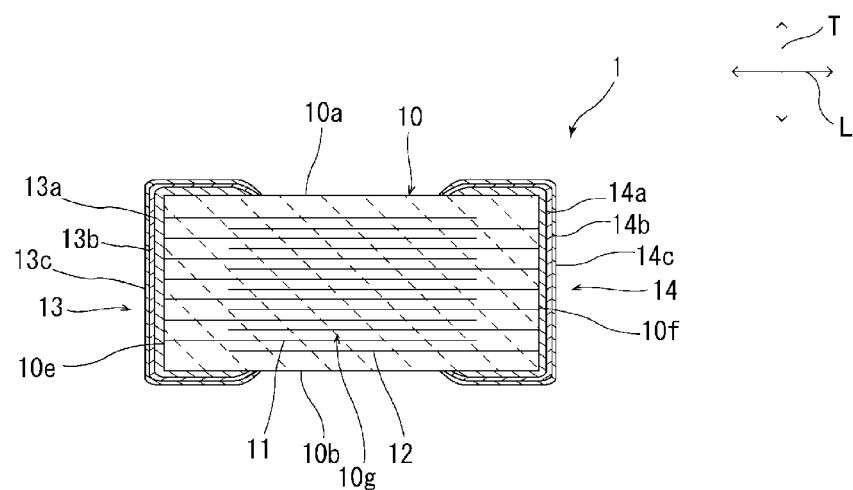
FIG. 2 is a schematic sectional view of the ceramic electronic component taken along line II-II of FIG. 1.

FIG. 1 is a schematic perspective view of the ceramic electronic component 1 according to a preferred embodiment of the invention. FIG. 2 is a schematic sectional view of the ceramic electronic component 1 taken along line II-II of FIG. 1.

The ceramic electronic component 1 shown in FIGS. 1 and 2 may be a ceramic capacitor, a piezoelectric component, a thermistor, or an inductor, for example.

The ceramic electronic component 1 includes an electronic component body (ceramic base) 10 that preferably has a rectangular or substantially rectangular parallelepiped shape. The electronic component body 10 includes first and second principal surfaces 10a and 10b, first and second side surfaces 10c and 10d (see FIG. 2), and first and second end surfaces 10e and 10f (see FIG. 2). The first and second principal surfaces 10a and 10b extend along the longitudinal direction L and the widthwise direction W. The first and second side surfaces 10c and 10d extend along the thickness direction T and the longitudinal direction L. The first and second end surfaces 10e and 10f extend along the thickness direction T and the widthwise direction W. The longitudinal direction L, the widthwise direction W, and the thickness direction T are perpendicular to each other.

In the present invention, "rectangular parallelepiped" includes a rectangular parallelepiped having a rounded portion at a corner or a ridge. That is, a "rectangular parallelepiped" member refers to any member including first and second principal surfaces, first and second side surfaces, and first and second end surfaces. A step portion or uneven portion may be provided in some or all of the first and second principal surfaces, first and second side surfaces, and first and second end surfaces.

The dimensions of the electronic component body 10 are not particularly restricted. It is preferable, however, that the electronic component body 10 have a thickness of about 0.2 mm to about 3.0 mm, a length of about 0.4 mm to about 5.7 mm, and a width of about 0.2 mm to about 5.0 mm, for example.

The electronic component body 10 is made of a suitable type of ceramics in accordance with the function of the ceramic electronic component 1. More specifically, if the ceramic electronic component 1 is a capacitor, the electronic component body 10 may be made of dielectric ceramics. Specific examples of dielectric ceramics are $BaTiO_3$, $CaTiO_3$, $SrTiO_3$, and $CaZrO_3$. If necessary, a secondary compound, such as a Mn compound, an Mg compound, a Si compound, a Fe compound, a Cr compound, a Co compound, a Ni compound, or a rare earth compound, may be added to the electronic component body 10 in accordance with the characteristics demanded for the ceramic electronic component 1.

If the ceramic electronic component 1 is a piezoelectric component, the electronic component body 10 may be made of piezoelectric ceramics. A specific example of piezoelectric ceramics is lead zirconate titanate (PZT).

If the ceramic electronic component 1 is a thermistor, the electronic component body 10 may be made of semiconductor ceramics. A specific example of semiconductor ceramics is spinel ceramics.

If the ceramic electronic component 1 is an inductor, the electronic component body 10 may be made of magnetic ceramics. A specific example of magnetic ceramics is ferrite ceramics.

As shown in FIG. 2, inner electrodes are disposed within the electronic component body 10. More specifically, a plurality of first inner electrodes 11 and a plurality of second inner electrodes 12 are disposed within the electronic component body 10.

The first inner electrodes 11 preferably have a rectangular or substantially rectangular shape. The first inner electrodes 11 are disposed in parallel or substantially in parallel with the first and second principal surfaces 10a and 10b (see FIG. 1). That is, the first inner electrodes 11 are disposed along the longitudinal direction L and the widthwise direction W. The first inner electrodes 11 are exposed to the first end surface 10e and are not exposed to the first and second principal surfaces 10a and 10b, the first and second side surfaces 10c and 10d, and the second end surface 10f.

The second inner electrodes 12 preferably have a rectangular or substantially rectangular shape. The second inner electrodes 12 are disposed in parallel or substantially in parallel with the first and second principal surfaces 10a and 10b (see FIG. 1). That is, the second inner electrodes 12 are disposed along the longitudinal direction L and the widthwise direction W. Accordingly, the second inner electrodes 12 and the first inner electrodes 11 are parallel or substantially parallel with each other. The second inner electrodes 12 are exposed to the second end surface 10f and are not exposed to the first and second principal surfaces 10a and 10b, the first and second side surfaces 10c and 10d, and the first end surface 10e.

The first and second inner electrodes 11 and 12 are alternately disposed along the thickness direction T. Adjacent first and second inner electrodes 11 and 12 in the thickness direction T oppose each other with a ceramic portion 10g interposed therebetween. The thickness of the ceramic portion 10g preferably is about 0.5 μm to about 10 μm, for example.

The first and second inner electrodes 11 and 12 may be made of a suitable conductive material, for example, a metal selected from the group consisting of Ni, Cu, Ag, Pd, and Au, or an alloy containing at least one of such metals (for example, an alloy of Ag and Pd).

The thickness of the first and second inner electrodes 11 and 12 is preferably about 0.2 μm to about 2.0 μm, for example.

As shown in FIGS. 1 and 2, the ceramic electronic component 1 includes first and second outer electrodes 13 and 14. The first outer electrode 13 is electrically connected to the first inner electrodes 11 on the first end surface 10e. The second outer electrode 14 is electrically connected to the second inner electrodes 12 on the second end surface 10f.

The first outer electrode 13 covers the first end surface 10e and extends from the first end surface 10e to the first and second principal surfaces 10a and 10b and the first and second side surfaces 10c and 10d. The second outer electrode 14 covers the second end surface 10f and extends from the second end surface 10f to the first and second principal surfaces 10a and 10b and the first and second side surfaces 10c and 10d. The first and second outer electrodes 13 and 14 may cover the first and second end surfaces 10e and 10f, respectively, and extend only to the first and second principal surfaces 10a and 10b, respectively, or such that they cover the first and second end surfaces 10e and 10f, respectively, and extend to neither of the first and second principal surfaces 10a and 10b nor the first and second side surfaces 10c and 10d, respectively.

The first outer electrode 13 includes a fired electrode layer 13a and first and second plated layers 13b and 13c. The fired electrode layer 13a and the first and second plated layers 13b and 13c are stacked on each other in this order in which they are positioned closer to the electronic component body 10. The second outer electrode 14 includes a fired electrode layer 14a and first and second plated layers 14b and 14c. The fired electrode layer 14a and the first and second plated layers 14b and 14c are stacked on each other in this order in which they are positioned closer to the electronic component body 10.

The fired electrode layers 13a and 14a are disposed on the electronic component body 10. The fired electrode layers 13a and 14a are in contact with the electronic component body 10.

The term "fired electrode layer" refers to an electrode layer formed by firing a paste containing metal powder. Accordingly, the fired electrode layers 13a and 14a contain metal. The fired electrode layers 13a and 14a preferably contain a glass component in addition to metal. In this case, a glass component serves as adhesive so as to secure the adhesiveness between the fired electrode layers 13a and 14a and the electronic component body 10. This significantly reduces or prevents the entry of liquids and moisture into the electronic component body 10.

The fired electrode layers 13a and 14a preferably contain at least one of Cu, Ni, Ag, Pd, an Ag—Pd alloy, and Au, and more preferably contain Cu. The percentage of the glass content in the fired electrode layers 13a and 14a is preferably about 5 percentage by volume to about 30 percentage by volume, for example.

The thickness of the fired electrode layers 13a and 14a is preferably about 1 μm to about 15 μm, for example. The thickness of the fired electrode layers 13a and 14a may be measured at the following position if, for example, the ceramic electronic component 1 is mounted on a mount board. The thickness of the fired electrode layers 13a and 14a at each of the centers in the longitudinal direction L and the widthwise direction W positioned on the principal surface of the ceramic electronic component 1 mounted on the mount board may be measured.

The first plated layer 13b is disposed on the fired electrode layer 13a. The first plated layer 14b is disposed on the fired electrode layer 14a. The first plated layers 13b and 14b preferably are Ni-plated layers. The thickness of the first plated layers 13b and 14b is about 3 μm to about 8 μm, for example.

The first plated layers 13b and 14b may preferably be formed by using low-stress plating. As a non-limiting example of low-stress plating, the first plated layers 13b and 14b may be formed by using a plating bath in which an organic additive is added to a Watts plating bath, in which case, the stress can be controlled according to this additive. The first plated layers 13b and 14b preferably have a compressive stress rather than a tensile stress. By forming the first plated layers 13b and 14b by using low-stress plating, the stress of the first plated layers 13b and 14b themselves is reduced, thus improving the resistance to deformation of a circuit board when mounting the ceramic electronic component 1 on the circuit board and the resistance to cracks which may be produced due to stress during reflow soldering.

In this preferred embodiment, the second plated layers 13c and 14c preferably have a thin film structure having a thickness of about 0.025 μm to about 1 μm, for example. Accordingly, to prevent the exposure of the fired electrode layers 13a and 14a, the first plated layers 13b and 14b are preferably thick. This, however, increases the stress of the first plated layers 13b and 14b themselves. Thus, by using low-stress plating, as described above, it is possible to further improve the resistance to deformation of a circuit board when mounting the ceramic electronic component 1 on the circuit board and the resistance to cracks which may be produced due to stress during reflow soldering.

The second plated layer 13c is disposed on the first plated layer 13b. The second plated layer 14c is disposed on the first plated layer 14b. The second plated layers 13c and 14c are made of Pd. Au or Pt may be used for the second plated layers 13c and 14c. In this case, however, the use of cyanide is required, which is not suitable in terms of the safety. Cyanide may also melt the first plated layers 13b and 14b, in which case, the reliability may be decreased. The thickness of the second plated layers 13c and 14c is preferably about 0.025 μm to about 1 μm, for example.

As described above, by providing the Ni-containing first plated layers 13b and 14b preferably having a thickness of about 3 μm to about 8 μm, for example, and the Pd-containing second plated layers 13c and 14c preferably having a thickness of about 0.025 μm to about 1 μm in the ceramic electronic component 1, it is possible to significantly reduce or prevent the degradation of the ceramic electronic component 1 caused by the exhaust gas or gas generated from a lubricant in an engine or a transmission and also to implement high mountability of the ceramic electronic component 1 on a mount board by using a conductive adhesive.

In the ceramic electronic component 1, the Ni-containing first plated layers 13b and 14b preferably having a thickness of about 3 μm to about 8 μm, for example, are disposed. The first plated layers 13b and 14b seal oil components contained in the exhaust gas or gas generated from a lubricant in an engine or a transmission. These first plated layers 13b and 14b have the properties of forming a passivation coating resistant to metal corrosive components, such as sulfur components, and impeding the progress of the melting of metal. The provision of the first plated layers 13b and 14b may prevent oil components contained in the exhaust gas or gas from being in contact with the underlying electrode layers. It may be thus possible to stop the metal in the underlying electrode layers from precipitating and reaching the outermost surfaces of the outer electrodes. As a result, it may be possible to significantly reduce or prevent the degradation of the ceramic electronic component 1 without impairing the functions of the outer electrodes for a long term use.

If the thickness of the first plated layers 13b and 14b is smaller than about 3 μm, the sealing characteristics of the first plated layers 13b and 14b to prevent the corrosion of the fired electrode layers 13a and 14a are not sufficiently secured. In this case, the corrosion of the underlying electrode layers may occur. In contrast, if the thickness of the first plated layers 13b and 14b is greater than about 8 μm, the stress applied to the electronic component body 10 from the first plated layers 13b and 14b is increased, and thus, cracks may be produced in the electronic component body 10.

In a ceramic electronic component including an outer electrode including a Ni-containing first plated layer as the outermost layer, the mountability of the ceramic electronic component on a mount board by using a conductive adhesive is not high. The reason for this is as follows. Electrical bonding between a conductive adhesive and an outer electrode is obtained by physical contact between metal powder contained in the conductive adhesive and the surface of the outer electrode. If the Ni-containing first plated layer is used as the outermost layer, the resistance is increased due to the oxidation of Ni, and thus, electrical bonding is not implemented. This phenomenon is noticeable particularly when such a ceramic electronic component is used in a vehicle. Accordingly, in the ceramic electronic component 1 of this preferred embodiment, the Pd-containing second plated layers 13c and 14c are disposed on the Ni-containing first plated layers 13b and 14b. With the use of plated layers containing precious metal, the corrosion resistance becomes higher, and the affinity between the outer electrode and the conductive adhesive becomes higher than in the use of plated layers containing non-precious metal, thus implementing electrical bonding between the outer electrode and the conductive adhesive. Thus, the ceramic electronic component 1 exhibits high mountability with the use of conductive adhesive. Additionally, without containing Ag in the outermost layers of the outer electrodes 13 and 14, the ceramic electronic component also exhibits the effect of suppressing electrochemical migration. The thickness of the second plated layers 13c and 14c preferably is about 0.025 μm or greater, for example. Accordingly, the ceramic electronic component 1 has a high resistance to the moisture. The thickness of the second plated layers 13c and 14c preferably is about 1 μm or smaller, for example. Accordingly, it is less likely that the outer electrodes 13 and 14 are degraded due to a temperature change.

If the thickness of the second plated layers 13c and 14c is smaller than about 0.025 μm, the second plated layers 13c and 14c do not sufficiently cover the surfaces of the Ni-containing first plated layers 13b and 14b, respectively. Thus, it may not be possible to sufficiently suppress the oxidation of the Ni-containing first plated layers 13b and 14b, which may adversely influence the electrical bonding with the conductive adhesive. More specifically, the Ni-containing first plated layers 13b and 14b are exposed, and Ni is oxidized or appears on the surface, which may increase the electrical resistance of the first plated layers 13b and 14b or increase the bonding resistance with the conductive adhesive. Additionally, due to the volume expansion caused by the oxidization or the corrosion of the outer electrodes 13 and 14, the adhesion force of the conductive adhesive is decreased, thus causing delamination at the interface between the outer electrodes 13 and 14 and the conductive adhesive. As a result, the electrical bonding, as well as the physical bonding, may not be implemented.

If the thickness of the second plated layers 13c and 14c is greater than about 1 μm, the hydrogen storage reaction occurs in the second plated layers 13c and 14c, and the volume of the second plated layers 13c and 14c may be expanded and broken. As a result, the first plated layers 13b and 14b are exposed, which may cause a poor connection of the outer electrodes or may make it difficult to suitably mount the ceramic electronic component 1 by using a conductive adhesive.

The manufacturing method of the ceramic electronic component 1 is not particularly restricted. The ceramic electronic component 1 may be manufactured, for example, in the following manner.

First, the electronic component body 10 including the first and second inner electrodes 11 and 12 is fabricated. The fabrication of the electronic component body 10 will be described more specifically. First, a ceramic paste containing ceramic powder is applied in the form of a sheet by using, for example, screen printing, and is dried. As a result, ceramic green sheets are formed.

Then, a conductive paste for forming inner electrodes is applied to the surfaces of some ceramic green sheets in the form of a predetermined pattern by using, for example, screen printing. As a result, green sheets with conductive patterns to define inner electrodes and green sheets without such conductive patterns are prepared. The ceramic paste and the conductive paste may contain a known binder or solvent.

Then, a predetermined number of ceramic green sheets without conductive patterns to define inner electrodes are stacked on each other, and then, on top of such ceramic green sheets, the ceramic green sheets with conductive patterns for forming inner electrodes are stacked on each other. Then, on top of such ceramic green sheets, a predetermined number of ceramic green sheets without conductive patterns to define inner electrodes are stacked on each other. In this manner, a mother multilayer body is fabricated. If necessary, the mother multilayer body may be pressed in the stacking direction by means of, for example, isostatic pressing.

Then, the mother multilayer body is cut into individual portions of a predetermined size so as to fabricate a plurality of raw ceramic bases. In this case, barrel-polishing may be conducted on the raw ceramic bases, thus chamfering the ridge or corner portions.

Then, the raw ceramic bases are fired. As a result, the electronic component body 10 is fabricated. The firing temperature for the raw ceramic bases may be suitably set in accordance with the type of ceramics or conductive material, and, for example, it may be set to be about 900° C. to about 1300° C.

Then, a conductive paste is applied to both end surfaces of the electronic component body 10 and is baked, thus forming the fired electrode layers 13a and 14a. The baking temperature is preferably about 700° C. to about 1000° C., for example. The fired electrodes 13a and 14a may be formed at the same time as the firing of the raw ceramic base.

Then, the Ni-containing first plated layers 13b and 14b are formed on the fired electrode layers 13a and 14a, respectively, and then, the Pd-containing second plated layers 13c and 14c are formed on the Ni-containing first plated layers 13b and 14b, respectively. According to the above-described process, the ceramic electronic component 1 is manufactured.

Another layer, for example, a glass layer or a resin layer, may be formed between the fired electrode layers 13a and 14a and the electronic component body 10, or between the first plated layers 13b and 14b and the second plated layers 13c and 14c, or between the first plated layers 13b and 14b and the fired electrode layers 13a and 14a.

The present invention will be described below in detail through illustration of specific examples of various preferred embodiments. However, the present invention is not restricted whatsoever to the following examples of various preferred embodiments, and may be suitably modified without departing from the spirit of the invention.

First Example

Twenty ceramic electronic components (multilayer ceramic capacitors) configured in the following manner were fabricated by the method discussed in the above-described preferred embodiment.

Length of ceramic electronic component: 1.0 mm
Width of ceramic electronic component: 0.5 mm
Thickness of ceramic electronic component: 0.5 mm
Ceramic portion: $BaTiO_3$
Inner electrode: Ni
Metal contained in fired electrode layer: Cu
Thickness of fired electrode layer: 30 μm (center of the end surface), 5 μm (center of the side surface)
Baking temperature of fired electrodes: 850° C.
First plated layer: Ni (formed by low-stress plating, and more specifically, for relaxing the stress, the first plated layer was formed by using a plating bath to which 5% sodium saccharin was added as an organic additive)
Thickness of first plated layer: 3 μm
Second plated layer: Pd
Thickness of second plated layer: 0.1 μm Second Example Ceramic electronic components were fabricated, as in the first example, except that the thickness of the first plated layer was about 5 μm.

Third Example

Ceramic electronic components were fabricated, as in the first example, except that the thickness of the first plated layer was about 8 μm.

First Comparative Example

Ceramic electronic components were fabricated, as in the first example, except that the thickness of the first plated layer was 2 μm.

Second Comparative Example

Ceramic electronic components were fabricated, as in the first example, except that the thickness of the first plated layer was 10 μm.

Third Comparative Example

Ceramic electronic components were fabricated, as in the first example, except that each outer electrode was formed by the formation of a fired electrode layer containing Cu (the thickness at the center of the end surface was 30 μm) and a fired electrode layer containing an Ag—Pd alloy (the thickness at the center of the end surface was 30 μm) in this order and that the baking temperatures of the fired electrode layer containing Cu and the fired electrode layer containing an Ag—Pd alloy were 850° C. and 700° C., respectively.

Corrosion Test for Electrodes 500 cubic centimeters of a transmission lubricant was input into a glass desiccator having an inside dimension of 20 cm. Then, the samples of the multilayer ceramic capacitors fabricated in the individual examples and comparative examples were placed on shelves in the desiccator such that they would not be in direct contact with the transmission lubricant. Then, the desiccator was closed. In this state, the desiccator was left for 500 hours at 130° C. Thereafter, the samples were removed from the desiccator. The side surface of each sample was polished until the width was reduced to half so as to expose a cross section along the longitudinal direction L and the thickness direction T. The exposed cross section was observed with a metallographic microscope to check whether or not the metal contained in the fired electrode layer precipitated and reached the surface of the outer electrode. Then, if some samples were found in which the metal in the fired electrode layer precipitated and reached the surface of the outer electrode, they were counted as samples with a corroded outer electrode. The results are shown in Table 1.

Thermal Shock Cycle Test

The samples were mounted on an alumina substrate having a thickness of about 0.63 mm by using a conductive adhesive. Then, a temperature cycle in which the prepared mounting structure was heated to 150° C. from −55° C. and was then cooled to −55° C. again was conducted for 2000 cycles. Thereafter, the samples were removed from the alumina substrate. The side surface of each sample was polished until the width was reduced to half so as to expose a cross section along the longitudinal direction L and the thickness direction T. The exposed cross section was observed with a microscope to check for the occurrence of cracks in the electronic component body. The results are shown in Table 1.

TABLE 1

|  | First comparative example | First Example | Second example | Third example | Second comparative example | Third comparative example |
|---|---|---|---|---|---|---|
| Thickness of first plated layer | 2 μm | 3 μm | 5 μm | 8 μm | 10 μm | Fired electrode layer containing Cu and fired electrode layer containing Ag—Pd alloy |
| Thickness of second plated layer | 0.1 μm | 0.1 μm | 0.1 μm | 0.1 μm | 0.1 μm | |
| The number of samples with corroded electrode/ the total number of samples | 4/20 | 0/20 | 0/20 | 0/20 | 0/20 | 20/20 |

TABLE 1-continued

|  | First comparative example | First Example | Second example | Third example | Second comparative example | Third comparative example |
|---|---|---|---|---|---|---|
| The number of samples with cracks after thermal shock test/ the total number of samples | 0/20 | 0/20 | 0/20 | 0/20 | 18/20 | 0/20 |

The thicknesses of the first and second plated layers indicated in Table 1 and the following Table 2 were measured in the following manner. First, the side surface of each of five samples was polished until the width was reduced to half so as to expose a cross section along the longitudinal direction L and the thickness direction T. Then, in this cross section, the thicknesses of the first and second plated layers at the centers of the end surfaces of the electronic component body were measured with a measuring microscope. Then, the average of the ten measured thicknesses of the five samples was determined to be the thickness of the plated layer.

Evaluations of Contact Resistance after Humidity Test

The samples were mounted on an alumina substrate having a thickness of about 0.63 mm by using a conductive adhesive. Then, a DC voltage of 50 V was continuously applied to the mounted samples for 2000 hours under the environments of a temperature of 85° C. and 85% humidity. Thereafter, by using a four-terminal sensing resistance meter, the resistance was measured by causing a current to flow between the electrodes and the conductive adhesive with one pair of probe terminals and by measuring the voltage across the electrodes and the conductive adhesive with the other pair of probe terminals. Samples with a resistance value of 10 mΩ or higher were determined to be defectives. The results are shown in Table 2.

Evaluations of Fixing Strength after Humidity Test

The samples were mounted on an alumina substrate having a thickness of about 0.63 mm by using a conductive adhesive. Then, a DC voltage of 50 V was continuously applied to the mounted samples for 2000 hours under the environments of a temperature of 85° C. and 85% humidity. Then, a jig with a load cell was pressed against the end surfaces of the samples, and the maximum weights at which the samples were released from the alumina substrate were measured. Then, samples which were released from the alumina substrate at a weight of 2.5 N or smaller were determined to be defectives. The results are shown in Table 2.

Crack Test for Second Plated Layer

The surface (view: 100 μm×80 μm) of the second plated layer of the outer electrode positioned at the center of the end surface of each sample which was not yet been mounted was observed with an electron microscope with magnifying power of 1000 times. Then, samples with cracks on the second plated layer were determined to be defectives. The results are shown in Table 2.

TABLE 2

|  | Fourth comparative example | Fourth Example | Fifth example | Sixth example | Seventh example | Fifth comparative example |
|---|---|---|---|---|---|---|
| Thickness of first plated layer | 5 μm | 5 μm | 5 μm | 5 μm | 5 μm | 5 μm |
| Thickness of second plated layer | 0.01 μm | 0.025 μm | 0.05 μm | 0.1 μm | 1 μm | 5 μm |
| The number of samples with contact resistance defect/ the total number of samples | 5/20 | 0/20 | 0/20 | 0/20 | 0/20 | 0/20 |
| The number of samples with poor fixing strength defect/ the total number of samples | 6/20 | 0/20 | 0/20 | 0/20 | 0/20 | 0/20 |
| The number of samples with cracks/ the total number of samples | 0/20 | 0/20 | 0/20 | 0/20 | 0/20 | 8/20 |

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   an electronic component body including first and second principal surfaces extending along a longitudinal direction and a widthwise direction, first and second side surfaces extending along the longitudinal direction and a thickness direction, and first and second end surfaces extending along the widthwise direction and the thickness direction;
   an inner electrode disposed within the electronic component body; and
   an outer electrode that is disposed on the electronic component body and that is electrically connected to the inner electrode; wherein
   the outer electrode includes:
      a fired electrode layer disposed on the electronic component body;
      a first plated layer that is disposed on the fired electrode layer and that is a Ni-plated layer having a thickness of about 3 μm to about 8 μm; and
      a second plated layer that is disposed on the first plated layer and that is a Pd-plated layer having a thickness of about 0.025 μm to about 1 μm.

2. The ceramic electronic component according to claim 1, wherein the fired electrode layer contains glass.

3. The ceramic electronic component according to claim 1, wherein the fired electrode layer contains Cu.

4. The ceramic electronic component according to claim 1, wherein the ceramic electronic component is one of a ceramic capacitor, a piezoelectric component, a thermistor, and an inductor.

5. The ceramic electronic component according to claim 1, wherein the electronic component body has a rectangular or substantially rectangular parallelepiped shape.

6. The ceramic electronic component according to claim 1, wherein the electronic component body is made of dielectric ceramics.

7. The ceramic electronic component according to claim 1, wherein the electronic component body is made of piezoelectric ceramics.

8. The ceramic electronic component according to claim 1, wherein the electronic component body is made of semiconductor ceramics.

9. The ceramic electronic component according to claim 1, wherein the electronic component body is made of magnetic ceramics.

10. The ceramic electronic component according to claim 1, wherein the internal electrodes ha a rectangular or substantially rectangular parallelepiped shape.

* * * * *